(12) United States Patent
Goulon et al.

(10) Patent No.: US 11,704,643 B2
(45) Date of Patent: Jul. 18, 2023

(54) MODULE AND METHOD FOR DETECTING THE PRESENCE OF AN ELECTRONIC PAYMENT TERMINAL ON A RECEIVING DOCK, CORRESPONDING RECEIVING DOCK

(71) Applicant: Banks and Acquirers International Holding, Paris (FR)

(72) Inventors: Maxime Goulon, Chatuzange-le-Goubet (FR); Etienne Lebonnois, La Baume d'Hostun (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 765 days.

(21) Appl. No.: 16/443,190

(22) Filed: Jun. 17, 2019

(65) Prior Publication Data

US 2019/0385139 A1    Dec. 19, 2019

(30) Foreign Application Priority Data

Jun. 18, 2018 (FR) ...................................... 1855338

(51) Int. Cl.
*G06Q 20/20* (2012.01)
*G06F 1/16* (2006.01)
*G06F 13/40* (2006.01)

(52) U.S. Cl.
CPC ......... *G06Q 20/202* (2013.01); *G06F 1/1632* (2013.01); *G06F 13/4081* (2013.01)

(58) Field of Classification Search
CPC .. G06Q 20/202; G06F 1/1632; G06F 13/4081
(Continued)

(56) References Cited

U.S. PATENT DOCUMENTS

2002/0156949 A1\* 10/2002 Kubo .................. G06F 13/4081
710/72
2009/0276546 A1\* 11/2009 Lui ..................... G06F 13/4072
710/16

(Continued)

FOREIGN PATENT DOCUMENTS

CN        106598189 A      4/2017

OTHER PUBLICATIONS

French Search Report and Written Opinion dated Mar. 1, 2019 for corresponding French Application No. 1855338, filed Jun. 18, 2018.
(Continued)

*Primary Examiner* — Ariel J Yu
*Assistant Examiner* — Denisse Y Ortiz Roman
(74) *Attorney, Agent, or Firm* — David D. Brush; Westman, Champlin & Koehler, P.A.

(57) ABSTRACT

A module for detecting presence of an electronic payment terminal on a receiving dock having a connector intended to co-operate with a complementary connector of the electronic payment terminal. The connector of the receiving dock includes at least one series transmission pin intended for transmitting signals from the electronic payment terminal to the receiving dock. The module is configured to drive at least one module for signaling a presence of the electronic payment terminal on the receiving dock as a function of the voltage on the series transmission pin.

6 Claims, 3 Drawing Sheets

(58) Field of Classification Search
USPC .......................................................... 705/21
See application file for complete search history.

(56) References Cited

U.S. PATENT DOCUMENTS

| | | |
|---|---|---|
| 2014/0218045 A1 | 8/2014 | Shoykhet et al. |
| 2016/0283930 A1* | 9/2016 | Haga ..................... G06F 1/1632 |
| 2017/0287417 A1* | 10/2017 | Yamauchi ............. G09G 3/3696 |
| 2018/0143931 A1* | 5/2018 | Miyaoka ................ H03H 5/003 |

OTHER PUBLICATIONS

English translation of the French Written Opinion dated Mar. 1, 2019 for corresponding French Application No. 1855338, filed Jun. 18, 2018.

* cited by examiner

MODULE AND METHOD FOR DETECTING THE PRESENCE OF AN ELECTRONIC PAYMENT TERMINAL ON A RECEIVING DOCK, CORRESPONDING RECEIVING DOCK

1. TECHNICAL FIELD

The present invention relates to a system comprising a mobile terminal and a dock for receiving this terminal. More particularly, the invention is aimed especially at ensuring the detection of the presence of the terminal on its dock.

The present invention can be applied more particularly to a mobile electronic payment terminal, called an electronic payment terminal, and a dock for receiving this electronic payment terminal, also called dock, or charging or power supply base.

The invention can be applied however more generally to any system comprising a mobile terminal and a corresponding receiving dock.

2. PRIOR ART

It is known and recalled herein in a simplified manner that a mobile electronic payment terminal comprises a casing containing, within this casing, at least one electronic board connected to various peripheral components ensuring the operation of the terminal.

In addition, the electrical power supply of the terminal is provided by one or more power supply batteries disposed within the casing.

Such a mobile electronic payment terminal is usually provided with a receiving dock that can be connected to a computer by means of a wire link, for example according to the USB (Universal Series Bus) standard or RS232 or both. Such a dock makes it possible especially to provide electrical energy to the terminal, for example to recharge its power batteries. Such a dock also enables the exchange of information with the terminal by means of a connector provided with contacts present in the terminal and configured to cooperate with a connector of the dock via complementary contacts, called receiving contacts. Thus, when the electronic payment terminal is accurately positioned on its dock, the contacts of the electronic payment terminal rest against the receiving contacts of the dock so as to set up an electrical link between the dock and the electronic payment terminal.

Existing electronic payment terminals generally have four contacts intended to cooperate with the reception contacts of the dock, two of which are used to recharge the battery or batteries of the mobile electronic payment terminal and two to exchange data with the electronic payment terminal. To enable this data exchange, the dock comprises for example one or more processors and can therefore process the data received from the electronic payment terminal or simply transmit this data to the computer that is connected to it through communications connections present on the dock itself.

There are several existing techniques enabling the detection of the presence of an electronic payment terminal on its receiving dock, especially techniques based on an interfacing or dialog between the receiving dock and the electronic payment terminal, for example through one of the processors present in the dock.

However, these techniques require programming and software updates for the dock which proves to be highly limiting and very costly.

Besides, when compliance with certain standards on electronic payment terminals requires that the receiving dock should not contain any smart elements hence no processor for example and should be used only to power the electronic payment terminal, these techniques for detecting presence cannot be implemented.

There also exist techniques based on a direct driving of the electronic payment terminal by a computer for example which interfaces or dialogs with the electronic payment terminal via a USB type connection. For example, one of the techniques implements a detection of presence of the electronic payment terminal via detection of voltage on the line D+ of the USB. However, this technique makes it necessary to restrict the speed of USB communication, in order to ensure detection of accurate presence, thus impairing the performance of the USB link.

There is therefore a need to provide a technique that enables the detection of the presence of an electronic payment terminal on its dock without dedicated software resources, especially in the case of a receiving dock which, in order to comply with certain standards, does not include any "smartness" or "intelligence".

There is also a need to provide a solution of this kind that can be easily manufactured at low cost.

3. SUMMARY OF THE INVENTION

The present technique proposes a module for detecting the presence of an electronic payment terminal on a receiving dock comprising a connector intended to cooperate with a complementary connector of the electronic payment terminal, the connector of the receiving dock comprising at least one TX series transmission pin intended for a transmission of signals from the electronic payment terminal to the receiving dock.

According to the proposed technique, the presence detection module comprises means for driving at least one module for signaling or reporting a presence of the electronic payment terminal on the receiving dock as a function of the voltage on the TX series transmission pin.

Thus, the present technique proposes a novel and inventive solution for the detection of the presence of an electronic payment terminal on its dock in using the TX pin of the series link.

To this end, the voltage level of the TX pin of the series link is detected to determine whether the electronic payment terminal is present on its dock. Indeed, according to the protocol used for the series link, when the terminal is placed on its dock, the voltage on the TX pin is known and for example appreciably ranges from −5 v to −15 v according to the series protocol implemented. When the terminal is removed from the dock, the voltage is known and appreciably below or equal to 0V according to the series protocol implemented.

It is therefore possible, through the proposed technique, to detect the presence or absence of the electronic payment terminal on its dock without implementing software means either in the dock or in the electronic payment terminal, in using a communications pin intended for another function.

Besides, the value of using the TX pin of the series link lies in the fact that the signals travelling through this link are less rapid and less sensitive than the other signals, especially when electronic components are added in parallel. Thus, the electronic components needed to implement the present technique will not have any negative impact on the signals of the series link. The proposed technique therefore makes it possible to overcome the drawbacks of certain prior art techniques using other signals (for example USB signals) to detect the presence or absence of an electronic payment terminal on its dock.

Finally, the proposed technique makes it possible to signal the presence of the electronic payment terminal on its base through specific signaling means driven by the detection module.

According to one particular aspect of the proposed technique, the driving means are connected at input with the TX series transmission pin and control the voltage and/or the current at output from the driving means so as to:
- activate the presence-signaling module when the voltage level at input of the driving means is lower than or equal to a first pre-determined threshold, and
- deactivate the presence-signaling module when the voltage level at input of the driving means is greater than the first pre-determined threshold and lower than or equal to a second pre-determined threshold.

Thus, the proposed technique is based on a first particular voltage on the TX pin, signifying the presence of the electronic payment terminal on its receiving dock whether or not series communication is in progress between the electronic payment terminal and a host device (through the dock).

For example, the first threshold corresponds to a voltage level substantially equal to −5V, or −4.5V depending on the components used and the series protocol used because, when the electronic payment terminal is on its dock, at rest (without communication on the series link) or when a logic "1" is transmitted, the voltage on the TX pin is lower than −5V (ranging appreciably from −15V and −5V).

Thus, when the electronic payment terminal is not on its dock, the voltage on the TX pin is appreciably equal to 0V or more broadly ranges from −5V to 0V. The second threshold therefore corresponds for example to a voltage level equal to 0V.

According to one particular characteristic, the detection module also comprises means for filtering the electronic signal at output from the driving means so as to keep the presence-signaling module deactivated when the voltage level at input of the driving means is greater than the second pre-determined threshold.

Thus, the proposed technique enables the accurate management of the transitions (passage from a logic "1" to a logic "0" and vice versa) during communication on the series link during which the voltage on the TX pin passes through 0V.

In this case, a removal of the electronic payment terminal should not be detected. Now, since the passage through a voltage substantially equal to the voltage representing a removal of the electronic payment terminal is temporary during communication (the logic "1" and "0" values follow one another), it is possible to see to it that such a passage by 0V does not activate the absence-signaling-module of the electronic payment terminal.

In this way, the proposed technique prevents a fast activation/deactivation sequencing of the presence-signaling module during a series communication. Thus, during a series communication, the detection module keeps the presence-signaling module activated even when "0s" are exchanged and the voltage passes into positive mode.

According to one particular aspect, the detection module also comprises idle voltage maintaining means connected at input with the TX series transmission pin and delivering at output a voltage substantially equal to a pre-determined idle value.

Thus, the proposed technique also prevents any disturbance on the series link when the electronic payment terminal is removed from its dock. Indeed, in this case, changes in the voltage level on the series link due to the absence of the electronic payment terminal could be received by a host device connected to the dock and interpreted as parasitic or unwanted characters.

To this end, the proposed technique provides for means for filtering the signal on the TX pin to maintain a known idle voltage level for the series link in question for example about −5V for an RS232 link.

Indeed, when the electronic payment terminal is absent, the voltage on the TX pin is appreciably equal to or lower than 0V and corresponds to the voltage at input of the maintaining means which output a voltage substantially equal to −5V. This is effective even when the 0V voltage is due to the passage from logic "0" to a logic "1" or vice versa during a transmission on the series link. Indeed, during a communication, the passage through 0V being almost instantaneous, the signal is not deformed.

For all the other input voltages of the maintaining means, these means have no action and there is no modification of the voltage at output.

Thus, the driving means control the voltage and/or the current at output of the driving means so as to:
- activate at least one absence-signaling module when the voltage level at input of the driving means is lower than or equal to a second pre-determined threshold, and
- deactivate the absence-signaling module when the voltage level at input of the driving means is smaller than a first pre-determined threshold.

Thus, the proposed technique also enables the driving of a module for signaling the removal of the electronic payment terminal from its dock in a manner that is complementary to the signaling of its presence.

Hence, the absence-signaling module is activated when the presence-signaling module is deactivated and the absence-signaling module is deactivated when the presence-signaling module is activated.

For example, the presence-signaling module corresponds to at least one light-emitting diode.

According to another particular aspect of the invention, the absence-signaling module corresponds to at least one light-emitting diode.

Thus, these embodiments enable a viewing of the presence or non-presence of the electronic payment terminal and especially make it possible to detect visually (for example by the merchant or a user of the electronic payment terminal) whether the electronic payment terminal is wrongly positioned on its receiving dock. This makes it possible for example to prevent it from being not charged when it has been positioned on its dock for recharging or else to quickly realize why a transaction has failed when the electronic payment terminal is supposed to be in operating mode and in communication through its dock.

The present technique also relates to a receiving dock comprising a presence-detecting module as described here above according to the different embodiments.

The proposed technique also relates to a method for detecting a presence of an electronic payment terminal on its receiving dock comprising a connector that is intended to cooperate with a complementary connector of said electronic payment terminal, the connector of the receiving dock comprising at least one TX series transmission pin intended for a transmission of signals from the electronic payment terminal to the receiving dock. The detection module as described here above is especially capable of implementing the presence-detection method, which includes a step for driving at least one module for signaling the presence of the electronic payment terminal on the receiving dock as a function of the voltage level on the TX series transmission pin.

4. DRAWINGS

Other features and characteristics of the invention shall appear more clearly from the following description of a particular embodiment given by way of a simple, illustratory and non-exhaustive example and from the appended drawings of which.

5. DESCRIPTION

For the sake of clarity, the same elements have been designated by same references in the different figures.

5.1. General Principle

The general principle of the proposed technique relies on the detection of the voltage level on the TX series transmission pin of a connector of a receiving dock of an electronic payment terminal to detect the presence of the electronic payment terminal on its dock.

Indeed, the voltage level at the TX series transmission pin can be considered to represent both the transmitted signal, logic "0" or logic "1", as well as the absence of the electronic payment terminal from its dock.

For example, for a series link according to the RS232 communications protocol, "0" logic level is represented by a known voltage appreciably ranging from +5V to +15V, whereas a logic level "1" is represented by a known voltage appreciably ranging from −15V to −5V. Thus, it is possible to detect whether the electronic payment terminal is on its dock when the voltage level on the TX pin is detected in the above-mentioned ranges or intervals.

In addition, when the electronic payment terminal is on its dock but no series communication is in progress, the idle level of the series link corresponds to a logic level "1" and is represented by a known voltage substantially equal to −5V.

Finally, when the electronic payment terminal is absent from its dock, the voltage level on the TX pin is substantially equal to 0V (and no communication can take place).

The proposed technique therefore takes these parameters into consideration to ensure the detection of the presence of an electronic payment terminal on its receiving dock, in hardware terms. Indeed, the proposed technique require no software application either in the electronic payment or in the dock.

In addition, as described here above with reference to the different embodiments, the electronic components which are advantageously chosen to be added to the electronic circuit of the receiving dock also prevent any deterioration or impact on the main function of the TX pin of the series link which consists in making a signal of the electronic payment terminal transit towards a remote device, denoted as a host device, via the receiving dock. Thus, the proposed technique does not impair the quality of the signal of the series link, unlike certain prior art techniques which slow down for example the signals sent through the USB link.

Besides, once the presence or absence of the electronic payment terminal is detected, the proposed technique also makes it possible to signal, for example visually, the presence (and/or absence) of the electronic payment terminal in its dock in a hardware manner through the layout of the dedicated components in the receiving dock.

Here below in the description, the above-mentioned components are considered to form part of a set of dedicated components forming a module for detecting the presence of an electronic payment terminal, such a module being possibly implemented for example in the receiving dock of an electronic payment terminal.

It must be noted that the examples of components cited here below are given purely by way of an illustration and that the general knowledge of those skilled in the art will enable them to choose to assemble other components, the combined characteristics of which make it possible to attain the anticipated technical effect, namely detecting the presence or absence of an electronic payment terminal on its receiving dock by detection of voltage on the TX pin of the series link.

5.2. Description of a First Embodiment

Figure 1A:
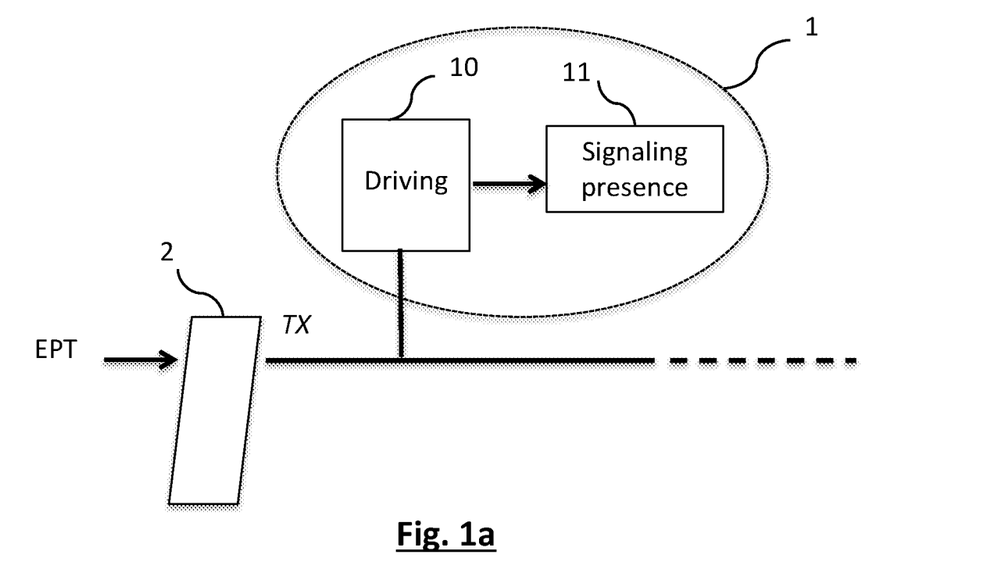
FIGS. 1a and 1b illustrate an example of a presence detection module according to two variants of a first embodiment of the proposed technique.
Figure 1B:
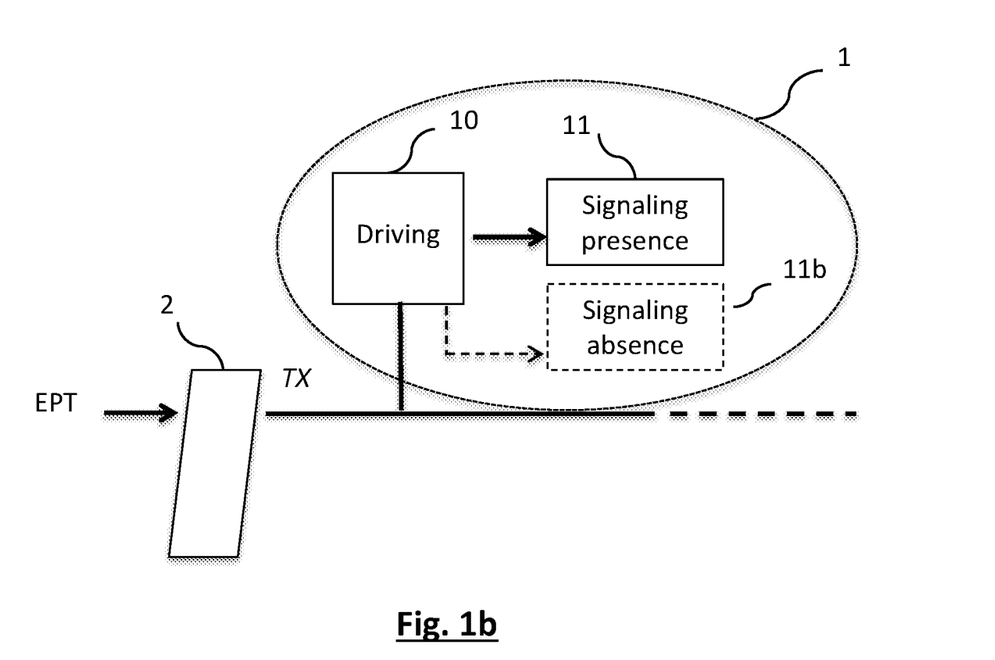

According to the first embodiment illustrated in FIGS. 1a and 1b, the module for detecting a presence 1 of an electronic payment terminal (not shown) comprises driving means 10 for driving at least one module 11 for signaling a presence of the electronic payment terminal on its receiving dock (not shown) as a function of the voltage on the TX pin of the series link (for example RS232) through which it is possible for the electronic payment terminal and a remote device, here below called a host, to communicate.

As already indicated, the TX pin is situated on a connector 2 of the receiving dock intended to cooperate with a complementary connector of the electronic payment terminal (not shown) and enables the reception of signals coming from the electronic payment terminal (TPE).

The driving means 10 are therefore connected at input with the TX series transmission pin and, as a function of the level of this input voltage, the driving means 10 control the voltage and/or the current at output so as to drive the presence-signaling module 11.

For example, according to this first embodiment, the driving means 10 make it possible to:
- activate the presence-signaling module 11 when the voltage level at input is below or equal to a first pre-determined threshold, i.e. when the electronic payment terminal is on its dock (the series link being used for communication or being at rest);
- deactivate the presence-signaling module 11 when the voltage level at input is above this first pre-determined threshold and below or equal to a second pre-determined threshold, i.e. when the electronic payment terminal is not on its dock.

For example, in the case of an RS232 type series link, the first predetermined threshold therefore corresponds to about −5V, i.e. the maximum voltage to transmit a logic «1» and the corresponding idle voltage on the series link, these two states of the series link corresponding also to the presence of the electronic payment terminal on its dock.

The case of the transmission of a logic "0", which corresponds to a positive voltage and is appreciably greater than +5V, is described in greater detail here below.

The second pre-determined threshold therefore, for its part, corresponds to about 0V, i.e. the voltage observed when the electronic payment terminal is absent from the dock.

In short, the electronic payment terminal is detected as being present when the voltage level is appreciably lower than −5V and it is detected as being absent when the voltage level is appreciably ranges from −5V to 0V.

There two thresholds are naturally dependent on the electronic components implemented, both for the series link in the connector of the receiving dock and for implementing the proposed technique. More particularly, the two thresholds depend on the components used for the driving means 10, the principle being that the driving means 10 can both activate the presence-signaling module 11 when the electronic payment terminal is on its dock and deactivate the presence-signaling module 11 when the electronic payment terminal is not on its dock.

For example, the driving means 10 include at least one Zener diode which, depending on the characteristics of the voltage at its pins, has different states (on, in reverse), and a bipolar transistor, which also has an off-state and an on-state depending on the current that flows through it.

Returning to the example of an RS232 series link, it is possible for example to implement the driving means 10 with the following components:
- a resistor R200 connected to the output of the TX arm;
- a Zener diode D200 with an inverse threshold voltage 9.1V for example;
- a PNP bipolar transistor Z200, the base of which is connected to the output of the Zener diode, the emitter to a +5V voltage source and the collector to the presence-signaling module as well as to ground (through a resistor).

When the voltage at input of the Zener diode is below approximately −4.5V (i.e. the result of the following computation: 5V−9.1V+0.7V with 5V being the applied voltage, 9.1V the inverse threshold voltage of the Zener diode and 0.7V the base emitter voltage of the bipolar transistor), which corresponds either to an idle state of the series link or to a state of communication in progress, the Zener diode comes on in reverse. A current therefore flows in the base of the transistor Z200 which therefore comes on and makes it possible to drive the activation of the presence-signaling module 11.

On the contrary, when the input voltage of the Zener diode ranges from −4.5V to 0V, which corresponds to a situation in which the electronic payment terminal is not on its dock, the Zener diode D200 is not on because the voltage is below its inverse voltage of 9.1V. There is therefore no current in the base of the transistor Z200 which is therefore off and does not activate the presence-signaling module 11.

In one variant of this embodiment illustrated in FIG. 1b, an absence-signaling module 11b of the electronic payment terminal of its dock is also implemented, itself driven also by the driving means 10 described here above.

Thus, when the electronic payment terminal is removed from its dock, this absence-signaling module 11b is activated by the driving means 10, and the presence-signaling module 11 is deactivated.

These two modules, namely the presence-signaling module 11 and absence-signaling module 11b, are therefore complementary or dual and cannot be in the same activated or deactivated state at the same time.

Thus, in the case described here above, when the electronic payment terminal is absent and when the bipolar transistor is off, the latter actually activates the absence-signaling module, thus automatically deactivating the presence-signaling module through the components implemented.

According to another variant, not shown, it is possible that the detection module 1 could include not the presence-detecting module 11 but only the absence-detecting module 11b.

According to this first embodiment of the proposed technique, the presence-signaling module 11 can be implemented through a light-emitting diode LED C2 of pre-determined color (for example green). Where it is present (first variant), the absence-signaling module 11b can also be implemented by a light-emitting diode LED C1, of another pre-determined color (for example red).

In addition, this absence-signaling module 11b or this presence-signaling module 11 also each include at least one switching transistor respectively called a first dual transistor T201-1 and a second dual transistor T201-2 which are themselves handled/driven for example by another transistor T200 directly connected to the collector of the bipolar transistor Z200 of the driving means 10.

Thus, when the bipolar transistor Z200 of the driving means 10 is on, it turns off the transistor T200 which also leads to the blocking of the first dual transistor T201-1 and turns off the red light-emitting diode LED C1. As a consequence, the second dual transistor T201-2 comes on and the green light-emitting diode LED C2 lights up on to report the presence of the electronic payment terminal.

Conversely, when the bipolar transistor Z200 of the driving means 10 is off, the transistor T200 then comes on. This switches the first dual transistor T201-1 and turns on the red light-emitting diode LED C1, thus reporting the absence of the electronic payment terminal. Consequently, the second dual transistor T201-2 gets turned off and the green light-emitting diode LED C2 gets turned off.

The cases described here above show therefore that the proposed technique makes it possible to detect the presence of the electronic payment terminal when the series link is at rest or in communication and to detect the removal of the electronic payment terminal.

By contrast, another situation must also be studied attentively: this is the situation where the electronic payment terminal is present and a logic "0" is transmitted on the series link. In this case the voltage at the TX pin is positive and appreciably included between +5V and +15V. This range has not yet envisaged for the time being.

Indeed, this situation could be likened to an absence of the electronic payment terminal from its dock, characterized by voltage on the TX pin that is positive and appreciably equal to 0V. Thus, when a logic "0" would be transmitted on the series link, the driving means would detect an absence of the electronic payment terminal and would deactivate the presence-signaling module (and would activate the absence-signaling module in the case of the variant described here above).

In the example described here above, this would have the effect of turning off the green light-emitting diode LED C2, and, in the variant, of turning on the red light-emitting diode LED C1.

In addition, when a logic "1" would be transmitted, the driving means then would again detect the presence of the electronic payment terminal and would again activate the presence-signaling module and would deactivate the absence-signaling module in the case of the variant described here above.

Again in the example described here above, this would have the effect of turning on the green light-emitting diode LED C2, and, in the variant, it would have the effect of turning off the red light-emitting diode LED C1.

Thus, the presence-signaling module would pass from an activated state to a deactivated state depending on the logic level transmitted on the series link, without the electronic payment terminal being removed from its dock, leading in the example described to a flashing of the green light-emitting diode.

In the first variant described, the result would be flashing of both green and red diodes, thus limiting the efficiency of the proposed technique in not making it possible to clearly visualize the presence or absence of the electronic payment.

Hence, additional filtering means are implemented to overcome this drawback, as described here below with reference to a second embodiment of the proposed technique.

5.3. Description of a Second Embodiment

Figure 2A:
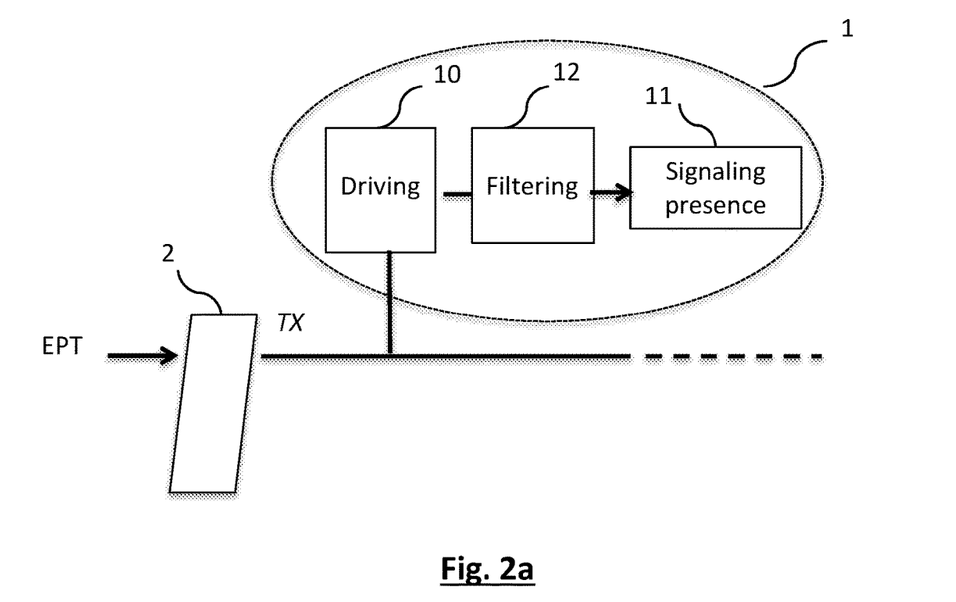
FIGS. 2a and 2b illustrate an example of a presence-detecting module according to two variants of a second embodiment of the proposed technique.
Figure 2B:
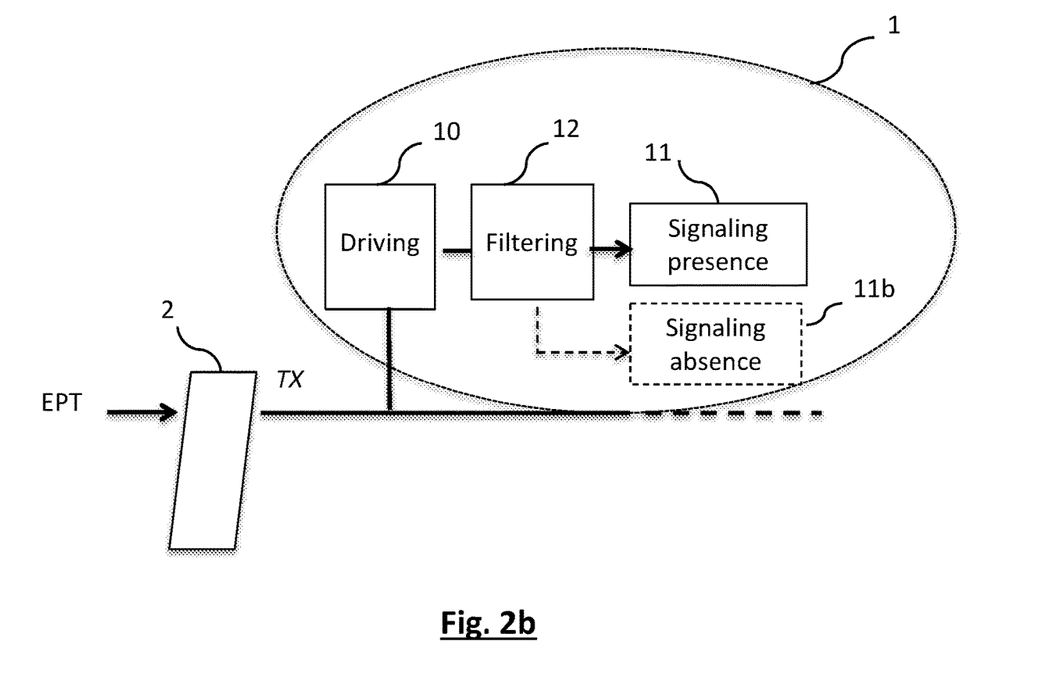

According to this second embodiment, illustrated in FIGS. 2a and 2b (corresponding to the first variant of the first embodiment), filtering means, for example in the form of a filtering module 12, are also implemented between the driving means 10 and the presence-signaling module 11 and, as the case may be, between the driving means 10 and the absence-signaling means 11b.

The role of this filtering module 12 is that it does not activate the presence-signaling module and/or absence-signaling module when a logic "0" is transmitted on the series link and thus does not erroneously report a removal of the electronic payment terminal from its dock.

If we consider the fact that the passage to a positive voltage in the event of transmission of a logic "0" during the series communication is temporary, the components implemented in the filtering module 12 are components that have a certain reaction inertia, for example a capacitor that gets charged very slowly and does not enable the rapid activation of either of the presence-signaling or absence-signaling modules, thus preventing the diodes from changing their state rapidly and therefore from flashing.

For example, the filtering module 12 includes a capacitor C205 which can get discharged into two resistors R202 and R203 to reach 0V.

Thus, in the case described here above with reference to the first embodiment, when the electronic payment terminal is removed from its dock, the bipolar transistor Z200 of the driving means 10 gets blocked and the transistor T200 then comes on, leading, after the charging time of the capacitor C205, to the switching of the first dual transistor T201-1 which turns on the red-light-emitting diode LED C1.

In addition, when the terminal is on its dock, the voltage is positive only when the terminal uses the RS232 link and sends a "0". As already indicated here above, since this state is only temporary, the charging time of the capacitor C205 makes this transition invisible to the presence-signaling module 11, and the absence-signaling module 11b in the case of the first variant described here above. This can also be applied to the second variant described with reference to the first embodiment, not illustrated for this second embodiment (the case where only the absence-signaling module is implemented).

Thus, the second dual transistor T201-2 and, in the variant, the first dual transistor T201-1 does not have the time to switch and therefore to act on the lighting or extinction of the diodes concerned, thus preventing the flashing of these diodes.

In short, according to this second embodiment, when the voltage at the TX pin is greater than 0V, i.e. voltage value corresponding to the second pre-determined threshold previously described and to the transmission of a logic "0" for example, the Zener diode D200 is on but the current in the base of the transistor Z200 is inverted. The transistor Z200 therefore remains off but the filtering module 12 makes it possible not to light the red diode and to not turn off the green diode when the electronic payment terminal is on its dock and when a communication is in progress, with transmission of a logic "0".

5.4. Description of a Third Embodiment

Figure 3A:
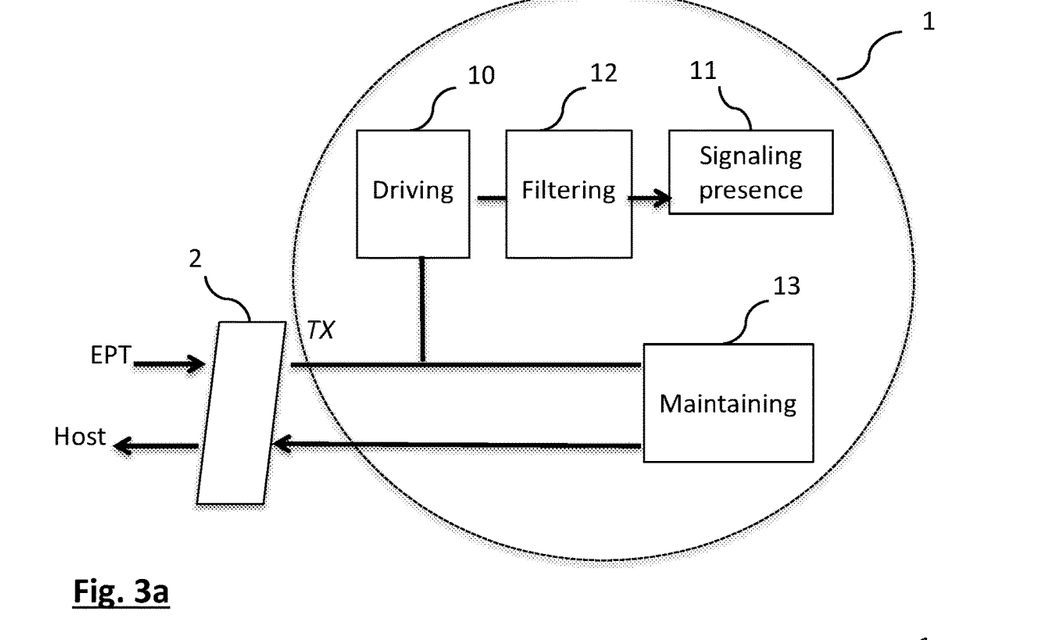
FIGS. 3a and 3b illustrate an example of a presence-detecting module according to two variants of a third embodiment of the proposed technique.
Figure 3B:
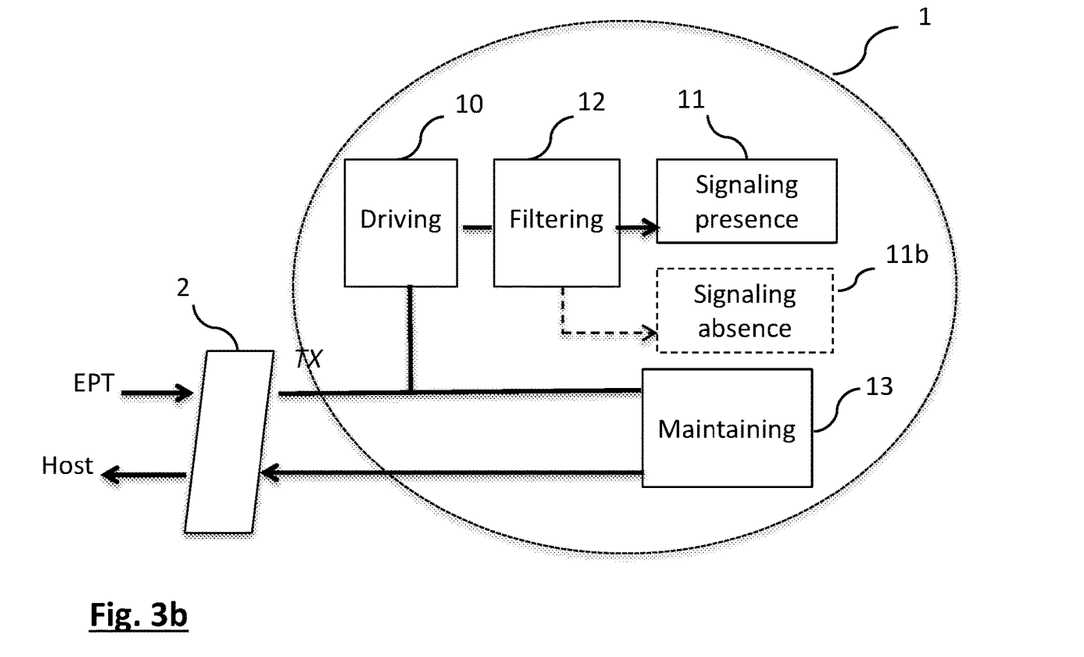

Referring now to FIGS. 3a and 3b, we describe a third embodiment of the proposed technique in which additional means are implemented in order to ensure the quality of the series link even when the electronic payment terminal is removed from its receiving dock.

Indeed, when the electronic payment terminal is not on a dock, the voltage on the TX pin or the connector 2 is substantially equal to 0V.

Now, this voltage could be interpreted as the transmission, on the series link, of parasitic or unwanted characters by a host device which itself is also connected to the dock. For example when a remote computer, serving as a cash register for a merchant, is connected to the receiving dock of the electronic payment terminal, such parasitic characters can give rise to errors of processing of the cash-desk software or even to a failure of operation.

In order to prevent this, the proposed technique therefore provides for the implementation of means for maintaining an idle voltage 13, connected at the input to the TX series transmission pin and delivering at output a voltage substantially equal to a pre-determined idle value.

Thus, for a host device, the removal of the electronic payment terminal from its dock does not disturb its operation.

For example, these maintenance means 13 comprise a plurality of electronic components used to deliver a voltage substantially equal to the voltage value considered as the idle level for the series link implemented (for example about −5V for an RS232 link) when the voltage on the TX pin is equal to 0V following the removal of the electronic payment terminal while having no effect when the electronic payment terminal is on its dock.

Since the knowledge of those skilled in the art will enable them to implement these maintaining means 13 with regard to the goal in view, the electronic components that can be used as well as the corresponding assembly diagram are neither illustrated nor described in greater detail herein.

As illustrated in FIG. 3b, these maintaining means 13 can be implemented equally well in the case of the first variant described with reference to the first and second embodiments, i.e. when a presence-signaling module 11 and an absence-signaling module 11b are implemented.

These maintaining means 13 can be implemented also in the case of the second variant described with reference to the first and second embodiments, i.e. when only an absence-signaling module is implemented.

Besides, although described and illustrated in the case of a detection module 1 comprising driving means 10 and filtering means 12, these maintaining means 13 can also be implemented in a control where a detection module 1 does not include filtering means 12.

5.5. Other Characteristics and Embodiments

The knowledge of those skilled in the art enables them to implement the means described here above in relation to the different embodiments, with regard to the goal sought for each of the means implemented, i.e. the driving according to a value of voltage on the TX pin, the signaling of presence, the filtering and maintaining of an idle voltage.

The electronic components that can be used as well as the corresponding assembly diagram are therefore neither illustrated nor described in greater detail herein. Only a few examples have been described here above.

The proposed technique also relates to a receiving dock comprising a detection module 1 for detecting the presence of an electronic payment terminal according to the different embodiments described here above. Thus, such a dock makes it possible to implement a detection and a signaling of the presence or of the removal of the electronic payment terminal without software implementation and without influencing its classic functioning, especially that of transmission by series link which is used to implement the invention.

Finally, the proposed technique also relates to a method of detection of the presence of an electronic payment terminal on its receiving dock, implemented in hardware terms by the means described here above in the receiving dock itself.

Naturally, the proposed technique is not limited to the embodiments described here above and provided solely by way of an example. It encompasses different modifications, alternative forms and other variants that could be envisaged by those skilled in the art in the context of the problems raised and especially all combinations of the different modes of operation described here above that can be taken separately or in association with one another.

The invention claimed is:

1. A device for detecting presence of an electronic payment terminal on a receiving dock comprising a connector to co-operate with a complementary connector of the electronic payment terminal, said connector of said receiving dock comprising at least one series transmission pin for a transmission of signals from said electronic payment terminal to said receiving dock, said device for detecting presence comprising:
    at least one presence-signaling circuit having a first state signaling a presence of said electronic payment terminal on said receiving dock and a second state signaling an absence of said electronic payment terminal on said receiving dock;
    a driving circuit configured to switch the at least one presence-signaling circuit between the first and second states as a function of a voltage on said series transmission pin, said driving circuit having an input connected to said series transmission pin, an output connected to an input of the presence-signaling circuit, and controlling a voltage and/or a current at the output of the driving circuit so as to:
        drive the at least one presence-signaling circuit in the first state when a level of the voltage at the input of said driving circuit is lower than or equal to a first pre-determined threshold, and
        drive the presence-signaling circuit in the second state when a level of the voltage at the input of said driving circuit is greater than the first pre-determined threshold and lower than or equal to a second pre-determined threshold;
    a filter connected to the output of the driving circuit, which filters an electronic signal at the output of said driving circuit, said filter comprising a capacitor having a charging time configured to maintain said presence-signaling circuit in the first state, when said presence-signaling circuit is in the first state and when the level of the voltage at the input of said driving circuit becomes temporarily greater than said second pre-determined threshold; and
    an idle voltage maintaining circuit comprising an input connected to said series transmission pin and delivering a voltage substantially equal to a pre-determined idle value at an output of the idle voltage maintaining circuit.

2. The device for detecting presence according to claim 1, further comprising at least one absence-signaling circuit having a first state signaling absence of said electronic payment terminal on said receiving dock and a second state signaling presence of said electronic payment terminal on said receiving dock, and which has an input connected to the output of the driving circuit, and wherein said driving circuit controls the voltage and/or the current at output of the driving circuit so as to:
    drive the at least one absence-signaling circuit in the first state when a level of the voltage at the input of said driving circuit is lower than or equal to said second pre-determined threshold, and
    drive said at least one absence-signaling circuit in the second state when a level of the voltage at the input of said driving circuit is smaller than said first pre-determined threshold.

3. The device for detecting presence according to claim 1, wherein said at least one presence-signaling circuit comprises at least one light-emitting diode.

4. The device for detecting presence according to claim 2, wherein said at least one absence-signaling circuit comprises at least one light-emitting diode.

5. The device according to claim 1, wherein the device is implemented in the receiving dock.

6. A method for detecting a presence of an electronic payment terminal on a receiving dock comprising a connector to co-operate with a complementary connector of said electronic payment terminal, said connector of said receiving dock comprising at least one series transmission pin for transmission of signals from said electronic payment terminal to said receiving dock, said method comprising:
    signaling presence or absence of said electronic payment terminal on said receiving dock with at least one presence-signaling circuit, which has a first state signaling the presence of said electronic payment terminal on said receiving dock and a second state signaling the absence of said electronic payment terminal on said receiving dock;
    driving, with a driving circuit having an input connected to said series transmission pin and an output connected to the presence signaling circuit, the at least one presence-signaling circuit between the first and second states as a function of a level of voltage on said series transmission pin, the driving comprising controlling a voltage and/or a current at the output of the driving circuit so as to:
        drive said at least one presence-signaling circuit in the first state when a level of the voltage at the input of said driving circuit is lower than or equal to a first pre-determined threshold, and drive said presence-signaling circuit in the second state when a level of the voltage at the input of said driving circuit is greater than the first pre-determined threshold and lower than or equal to a second pre-determined threshold;

filtering an electronic signal at the output of said driving circuit with a filter comprising a capacitor having a charging time configured to maintain said presence-signaling circuit in the first state, when said presence-signaling is circuit in the first state and when the level of the voltage at the input of said driving circuit becomes temporarily greater than said second pre-determined threshold; and maintaining an idle voltage on said series transmission pin, with an idle voltage maintaining circuit comprising an input connected to said series transmission pin and delivering a voltage substantially equal to a pre-determined idle value at an output of the idle voltage maintaining circuit.

\* \* \* \* \*